United States Patent

[11] 3,552,577

[72] Inventor Allen Latham, Jr.,
Jamaica Plain, Mass.
[21] Appl. No. 863,122
[22] Filed Oct. 2, 1969
[45] Patented Jan. 5, 1971
[73] Assignee Cryogenic Technology, Inc.
Waltham, Mass.
a corporation of Delaware

[54] APPARATUS FOR TRANSPORTING LIQUIDS
11 Claims, 10 Drawing Figs.
[52] U.S. Cl. .................................................... 211/74
[51] Int. Cl. ................................................ A47b 73/00
[50] Field of Search .......................................... 211/74, 71, 49

[56] References Cited
UNITED STATES PATENTS

| | | | |
|---|---|---|---|
| 2,180,042 | 11/1939 | Ettinger........................ | 128/276 |
| 2,278,390 | 3/1942 | Havlis........................... | 211/74X |
| 2,327,379 | 8/1943 | Thomas......................... | 211/74X |
| 2,919,814 | 1/1960 | Berkowitz ..................... | 211/74 |
| 3,318,457 | 5/1967 | Krasnoff....................... | 211/74 |
| 3,365,068 | 1/1968 | Crosby .......................... | 211/74 |

Primary Examiner—Nile C. Byers, Jr.
Attorney—Bessie A. Lepper

ABSTRACT: An apparatus for transporting liquids from one area to another while maintained in a predetermined order. Liquids for processing are contained in bottles or plastic pouches which are held in a carrier adapted to be slidably transferred to processing apparatus. The transport dolly is particularly suitable for use in processing human blood.

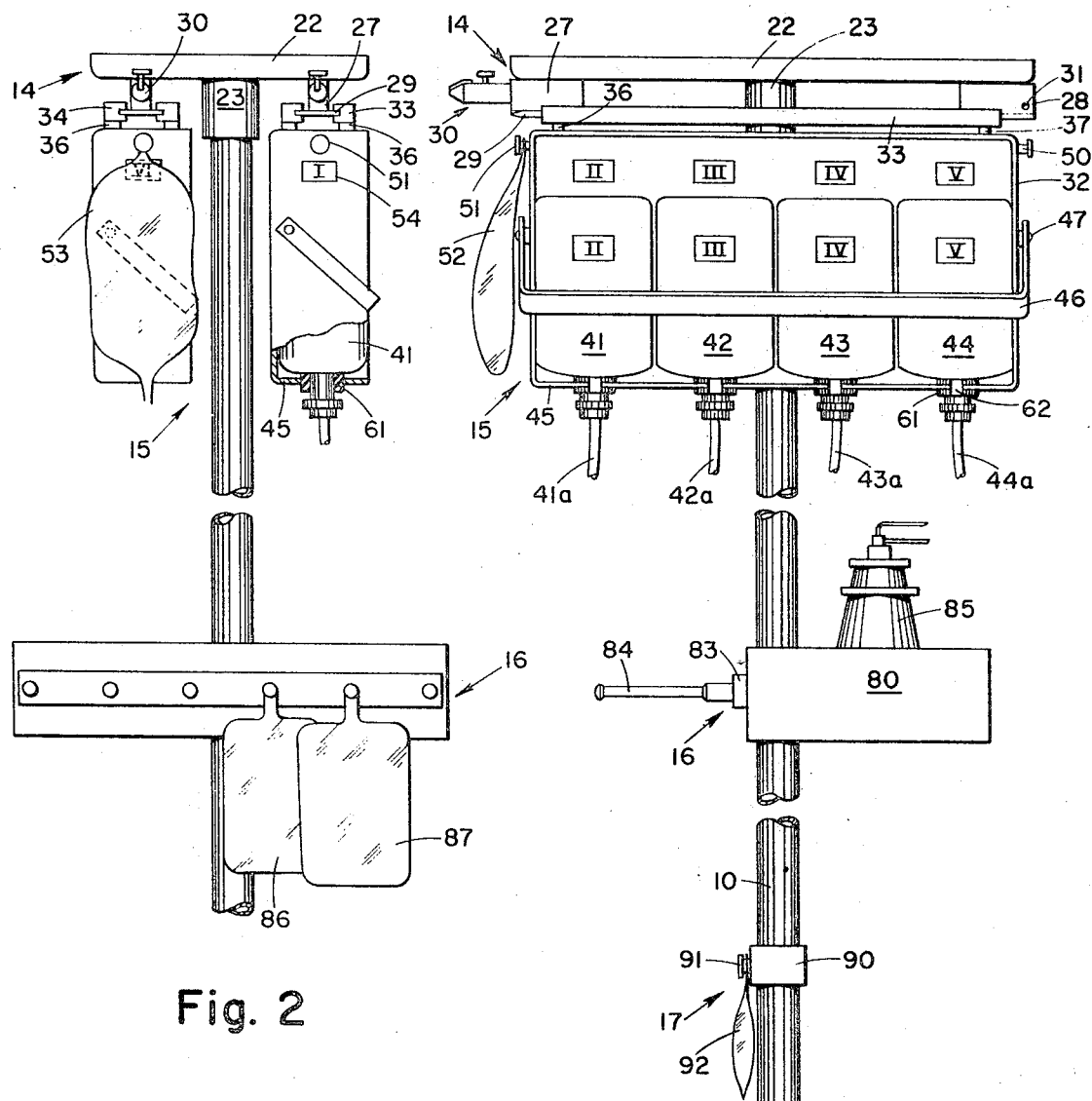

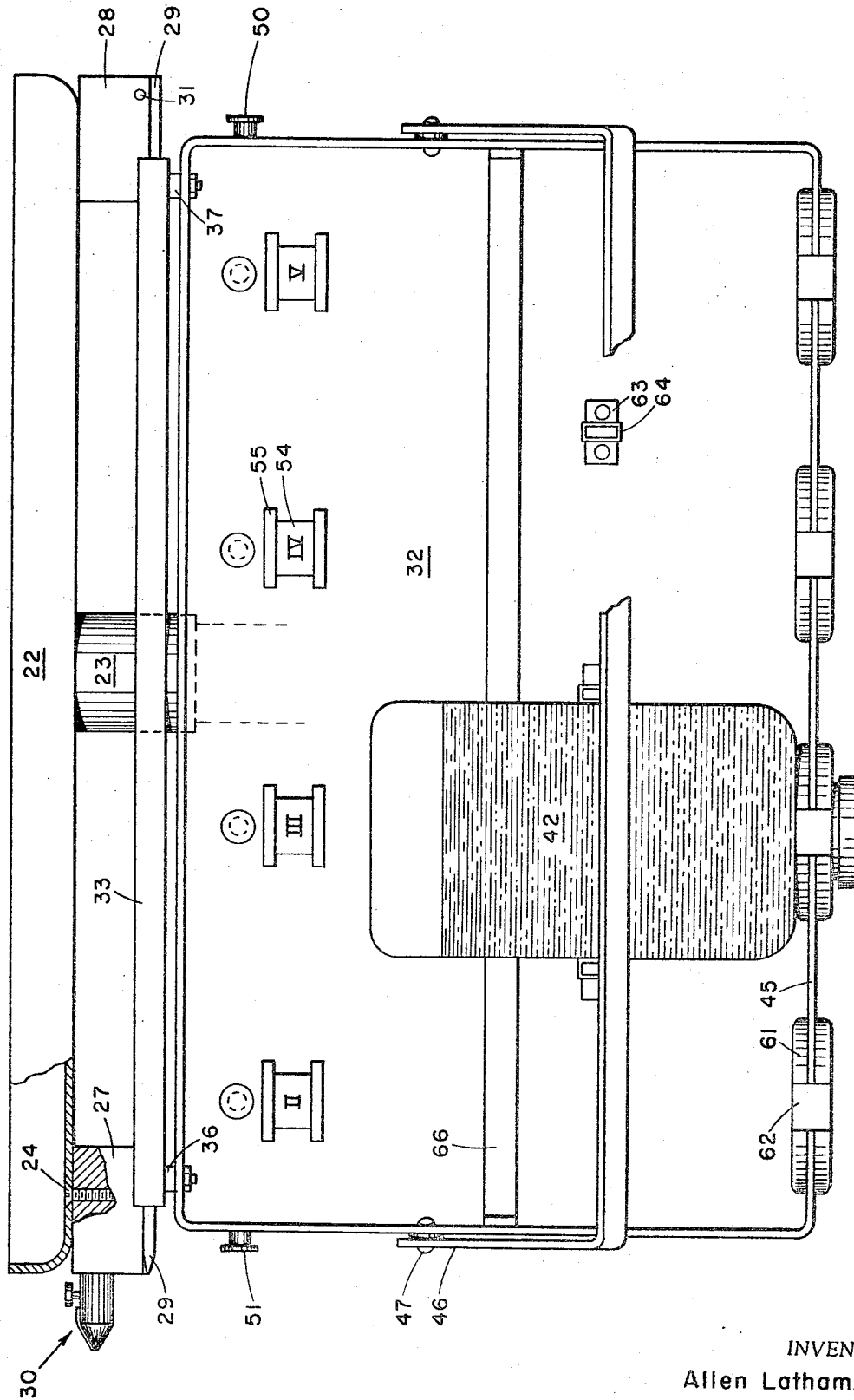

APPARATUS FOR TRANSPORTING LIQUIDS

This invention relates to an apparatus suitable for transporting liquids to be used in a predetermined sequence in processing operations and, more particularly to a transport dolly for transferring liquids used in the processing of human blood, as well as for transferring fresh blood and processed human blood, from area to area.

Long term storage of human blood requires that it be frozen in a liquid medium to protect it during storage. U.S. Pat. No. 3,145,913 describes and claims a preferred method and apparatus for handling blood which is to be stored. The blood is collected directly into a one-use sterile plastic liner placed in a centrifuge rotor wherein the red cells are stored after replacement of the intracellular and intercellular water by glycerol. When the blood is to be used it is brought up to temperature, the liner is placed again in the centrifuge rotor and the glycerol is replaced by a suitable saline liquid while the red cells remain in the centrifuge liner.

Subsequent to the collection of the blood from the donor, the red cells must be concentrated by centrifuging and the replacement of the natural intercellular and intracellular water with glycerol must be gradual, with the composition of this replacement liquid being varied from low to high glycerol. Likewise, when the blood is to be used it is brought up to ambient temperature and then the glycerol is gradually replaced during centrifugation with water by a wash solution, the composition of which is gradually varied by blending in order a low glycerol solution, then sodium lactate and them buffered isotonic saline liquid.

In a copending application Ser. No. 768,692, filed Oct. 18, 1968, I have disclosed a liquid programming and pumping apparatus for delivering a liquid mixture for achieving glycerolization or deglycerolization. The flow rate and composition of liquids used in these treatments must be continuously varied in accordance with a predetermined protocol and such a programming and pumping apparatus requires that liquid reservoirs deliver liquid to a mixing manifold so that the flow of the various liquids is changed in proper sequence.

By the process described in U.S. Pat. No. 3,145,913, and the apparatus disclosed in Ser. No. 768,692, it is possible to handle blood (as it is taken from the donor, process it for freezing and reprocess it for transfusion purposes after thawing) in self-sufficient single modules such as that illustrated in FIG. 2 of Ser. No. 768,692, as well as on a large scale in compactly spaced batteries of such modules. For efficient large capacity production where a battery of processing equipment of this type is needed, the handling of material and information is a formidable problem which places an additional requirements on the design of the system and equipment. It is, of course, absolutely essential that the right liquids are used in the correct amounts and in the correct sequence. Thus, errors in arranging bottles containing liquids to be used in the processing of the blood cannot be tolerated for the process must be fail-safe. The apparatus of this invention provides a unique type of transport dolly which markedly eases this materials-handling problem.

The apparatus described herein provides a means for moving bottles or plastic pouches containing processing liquid as well as flexible containers such as plastic bags which may hold whole blood and processed blood. When these liquids are moved from one area to another the proper sequence of the materials to be used is not disturbed; and at the same time all of the liquids as well as whole and processed blood are so positioned at all times to prevent errors in handling these liquids. The transport dolly of this invention is designed to be positively engaged with other apparatus so that the liquids contained within plastic bags and bottles may be moved directly without handling any of the individual bottles or plastic bags themselves. By minimizing the handling of the containers themselves it is also much easier to maintain the desired sterile regime.

It is, therefore, a primary object of this invention to provide an improved and unique transport dolly which is capable of moving liquids held in containers from one area to another while at the same time maintaining the liquids in a desired sequence. it is another object of this invention to provide a dolly of the character described which may be positively engaged with other apparatus so that the liquid containers may be transferred to the other apparatus without handling any of the liquid containers themselves. it is yet another object of this invention to provide apparatus of the character described which is particularly suitable for large-scale handling of materials for the processing of human blood, particularly the glycerolization and deglycerolization of human blood for long term storage.

The invention accordingly comprises the features of construction, combination of elements and arrangement of parts which will be exemplified in the constructions hereinafter set forth, and the scope of the invention will be indicated in the claims.

For a fuller understanding of the nature and objects of the invention reference should be had to the following detailed description taken in connection with the accompanying drawings in which:

FIG. 1 is a side elevational view of the transport dolly of this invention;

FIG. 2 is a front elevational view of the upper portion of the dolly of FIG. 1;

FIG. 3 is a detailed side elevational view of the bottle-carrier assembly;

Figure 4:
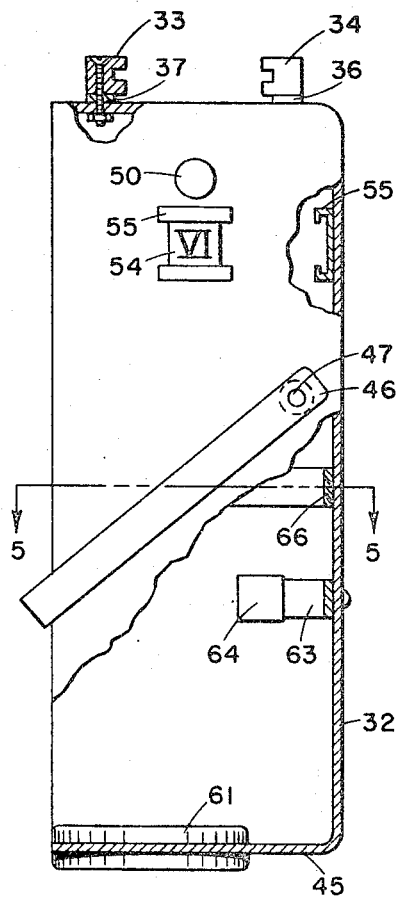
FIG. 4 is a detailed rear elevational view, partly cut away, of the bottle-carrier assembly.

The transport dolly of this invention is so arranged that it can conveniently transport two complete sets of solution bottles along with any other equipment, such as rotors, harnesses for the pumps and pouches of cells and resuspension media. The carriers for each set are hung on guide bars which match in height and size a guide bar on the processing equipment with which it is to be used. Equipment such as that shown in FIG. 2 of U.S. Ser. No. 768,692 is exemplary of the type of apparatus with which this transport dolly may be used. The guide bar obviates any necessity of manually handling individual bottles when loading or unloading the processor. Moreover, the bottle carriers can be so labeled that the correct bottle of liquid is always in the correct position. The dolly has a large tray in its midsection for carrying centrifuge rotors and other equipment. Below this tray is a convenient support button for holding bags of resuspension medium in a position to receive cells from the rotor by a siphon action. The dolly is so equipped that transfer of a pouch of processed cells from the centrifuge rotor to a resuspension medium may be carried out during transit from one station to another.

The transport dolly also makes it possible to maintain complete sterile sets intact from the time they are assembled at a preparation station until they are disassembled after processing and returned to the station. Any sterile connections which must be made may be made in a special clean air region of the preparation station where the control and responsibility for this particularly critical part of the whole procedure can be clearly established.

The transport dolly of this invention with a bottle carrier in place is shown in a side elevational view in FIG. 1. It will be seen to be comprised of a vertically disposed support post 10 which is affixed at its bottom end to a base 11 which is mounted on casters 12 which make it possible easily to roll the dolly along the floor. Affixed to the top end of the support post 10 is a top tray assembly generally indicated at 14; and suspended from it is a bottle-carrier assembly generally indicated at 15. Located in a substantially central position along the support post is a center tray assembly 16 and below this a bag support assembly 17.

The top tray assembly is shown in detail in FIGS. 1, 2 and 3 and reference should be had to these drawings in the description which follows. This tray assembly 14 comprises a tray 22 which is attached at its center to a collar 23 which in turn is affixed to the upper end of the support post 10. Through suitable means, such as screws 24 (FIG. 3), guide bar supports 27 and 28 are affixed to the bottom side of the tray, there being a pair of these on either side of the support post. Attached to or integral with each pair of guide bar supports 27 and 28 are guide bars 29, one on either side of the support post and running the length of the tray 22. Affixed to the guide bar supports on one end of the dolly are latch assemblies 30 which are described in detail below in connection with the description of FIGS. 6 and 7. On each of the guide bar supports on the opposite end from the ends to which the latch assemblies are attached are dowel pins 31 serving as a means to stop travel on the guide bar (FIG. 1).

The bottle carrier is suspended from guide bar 29. To accomplish this a pair of grooved parallel tracks 33 and 34 are attached to the top of bottle carrier 32 which is in the general form of an open-faced rectangular housing. These tracks are essentially the length of the bottle carrier. These tracks are attached to the bottle carrier 32 through parallel pairs of track supports 36 and 37 positioned at either end of the track. The bottle carrier 32 is designed to hold a plurality of bottles neck down in a liquid discharging position. Thus, for example in the dolly shown in FIG. 1 there are four bottles, 41, 42, 43 and 44, mounted in the carrier. It will be seen that there is attached to each of these bottles a plastic tubing 41a through 44a, respectively, suitable for incorporation in the programming and pumping means disclosed in the above identified U.S. Ser. No. 768,692 or for conducting liquids to any other suitable apparatus. The bottles are held in place in the bottle carrier 32 by neck-holding means in the bottom 45 of the embodiment of the bottle carrier shown in FIGS. 1—5. Should the carrier be tipped the bottles 41—44 are prevented from falling forward by the bottle guide bar 46 which is pivotedly attached to the bottle-carrier housing through a suitable pivot pin 47. One or more bag support pins, such as 50 and 51, may be located on the ends of the bottle carrier 32 for supporting plastic containers of whole blood, reconstituted blood, or any other liquid desired. Such plastic containers are illustrated as bags 52 and 53 in FIGS. 1 and 2, respectively.

In order to prevent any error in bottle alignment within the carrier, or the misplacing of liquid-containing bags on the various bag supports, it may be desirable to have some means for indicating the bottle or bag position, such as the numbered tags 54, within the bottle carrier or on its outside walls to correspond with labels on the bottles or bags. This then enables a technician to accurately align the processing liquids as well as to make a rapid check to see that they were accurately positioned. The amount of various liquids delivered to form a liquid processing composition as well as the final composition of the liquid will depend upon the position of the bottle within the carrier. it will be seen in the detailed drawing of the bottle carrier of FIG. 3 that label-holding means may take the form of a series of slot-defining members 55 into which labels or tags 54 may be readily slipped for any one protocol to be followed in the processing.

Figure 5:
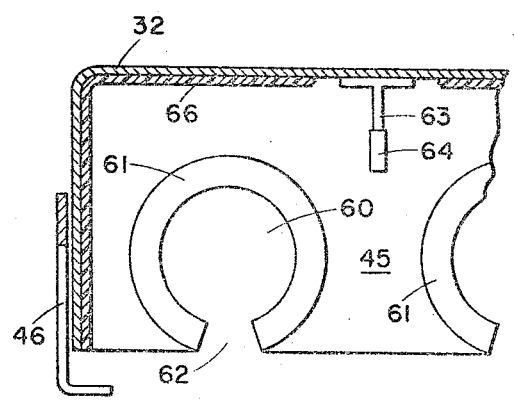
FIG. 5 is a partial cross section of one embodiment of the bottle-carrier assembly taken along lines 5–5 of FIG. 6.

As will be seen in FIG. 5, the bottom 45 of the bottle-carrier embodiment shown therein has a plurality of openings 60, one for each bottle to be held. Around the edge of the opening 60 is positioned a collar 61 formed of a resilient or elastomeric material to provide a cushion against which the neck of the bottle may rest. In the arrangement illustrated in the drawings the opening 60 has a narrow cut 62 communicating with the edge of the bottom 45 of the carrier to permit a bottle (e.g., bottle 42) having a tubing 42a communicating between the bottle and other apparatus e.g., the harness and manifold of a pump) to be slipped into the carrier while remaining sterilely connected. As will be apparent from the drawing in FIG. 3, the bottle carrier 32 is of such a configuration and size that it is possible to insert the bottle neck with a long tubing through the opening 60 by raising the guide bar 46 and raising the bottle neck above opening 60. It is also desirable to provide a series of T-shaped bottle dividers 63 which are affixed to the internal back wall of the housing defining the bottle carrier. The end of these T-shaped bottle spacers may be covered, if desired, with a thin band of rubber 64. Likewise, it may be desirable to extend a narrow band 66 of an elastomeric resilient material, such as rubber, around the internal walls of the housing in order to provide a cushioning means for the bottles held within the carrier.

The transport dolly of this invention is equipped to be positively engaged and locked with other apparatus to enable the bottle carrier 32 to be moved by means of its groove tracks along the guide bar 29 onto another apparatus, such as the processing apparatus shown in FIG. 2 of Ser. No. 768,692. Once the transport dolly is locked into the other apparatus, the bottle carrier may be transferred to the apparatus without fear of dropping it or of breaking or disrupting the order of the containers within the bottle carrier.

Figure 6:
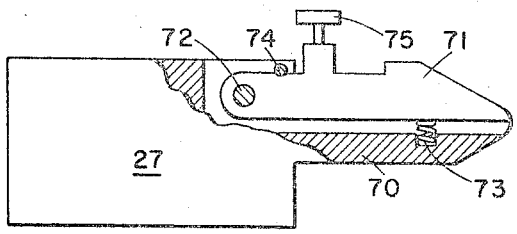
FIG. 6 is a side elevational view, partly cut away, of the positive latch assembly.
Figure 7:
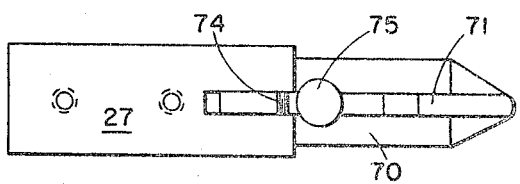
FIG. 7 is a top plan view of the latch assembly.

An exemplary latching means is illustrated in the partially cutaway side elevational view of FIG. 6 and the top plan view of FIG. 7. The latch body 71 is attached to or integral with the guide bar support 27. The latch pivots on a dowel or pivot pin 72, and is held in engaged position by means of spring 73. A pin 74 determines the upper position of the latch 71. For disengagement of the latch, there is provided a pressure button 75 which, when depressed downwardly, disengages the latch and permits the disengagement of the dolly from the apparatus to which it has been attached for transfer of the bottle carrier 32.

Figure 8:
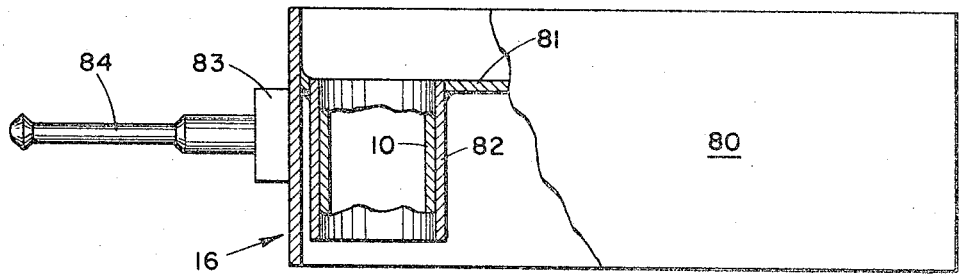
FIG. 8 is a front elevational view, partly cut away, of the central tray assembly.

The central tray assembly 16 is positioned below the bottle carrier at a convenient height for transferring any equipment from other apparatus to the dolly. This central tray assembly will be seen in FIGS. 1, 2 and 8 to be comprised of a tray frame 80 which has a recessed base 81 defining a shallow tray. Welded to an opening in the recessed base is a support post collar 82 which is designed to fit around and be attached to the outer wall of the support post 10. Along one side of the frame is a support block 83 which is adapted to support a plurality of bag support pins 84. FIG. 1 illustrates the use of the central tray assembly for carrying a centrifuge rotor 85 while FIG. 2 illustrates the use of the bag support racks for carrying several plastic bags 86 and 87.

Finally, FIG. 1 also illustrates the incorporation of a bag support assembly generally indicated by the numeral 17 which is placed between the center tray assembly 80 and the base 11. This bag support assembly comprises a collar 90 affixed to the support post 10 and having one or more bag support pins 91 for supporting a plastic bag such as 92. The positioning of one or more of these bag support assemblies can be adjusted to coincide with the type of operation which is being performed and with which the transport dolly of this invention is associated. Thus, for example it may be convenient to have collection bags which are filled through gravity flow and to position the bag assemblies below a centrifuge rotor or any other apparatus which is being used to process the liquids.

Figure 9:
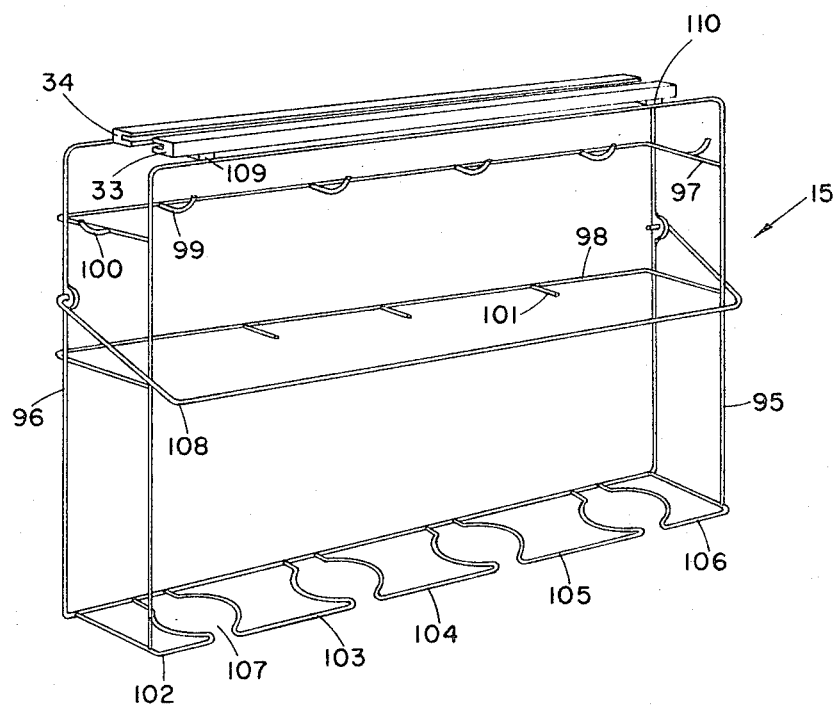
FIG. 9 is a perspective view of another embodiment of a bottle-carrier assembly.

FIG. 9 illustrates another embodiment of the bottle-carrying assembly formed of metal wire, that portion of the wire which makes contact preferably being coated with an elastomeric or other suitable resilient cushioning material. The bottle-carrier assembly of FIG. 9 is formed of two side frames 95 and 96 joined by an upper frame wire 97 and a centrally positioned frame wire 98, these wires extending from the rear, along one side and around the front to leave one side open for inserting bottles or plastic pouches. The upper frame wire 97 has hooks 99 positioned within the carrier and designed to hold plastic pouches, and end hooks 100 comparable in their role to bag support pins 51 of the bottle carrier of FIGS. 1 and 2. The centrally positioned frame wire 98 has a series of bottle separators 101 comparable to the T-piece separators 63 of FIGS. 3 and 4.

The bottom of the assembly is formed of a plurality of wire frames 102—106 contoured to form between the successive wire frames a plurality of circularlike openings 107, comparable to openings 60 of FIG. 5, on which the shoulders of bottles may rest to support the bottles in the carrier assembly. A pivotally mounted front bar 108 provides a means to hold the pouches or bottles in the carrier; and grooved tracks 33 and 34 are affixed to the side frames 95 and 96 through front and rear bars 109 and 110. The bottle-carrier assembly of FIG. 9 is carried on the dolly in the same manner as that of FIGS. 1—5.

Figure 10:
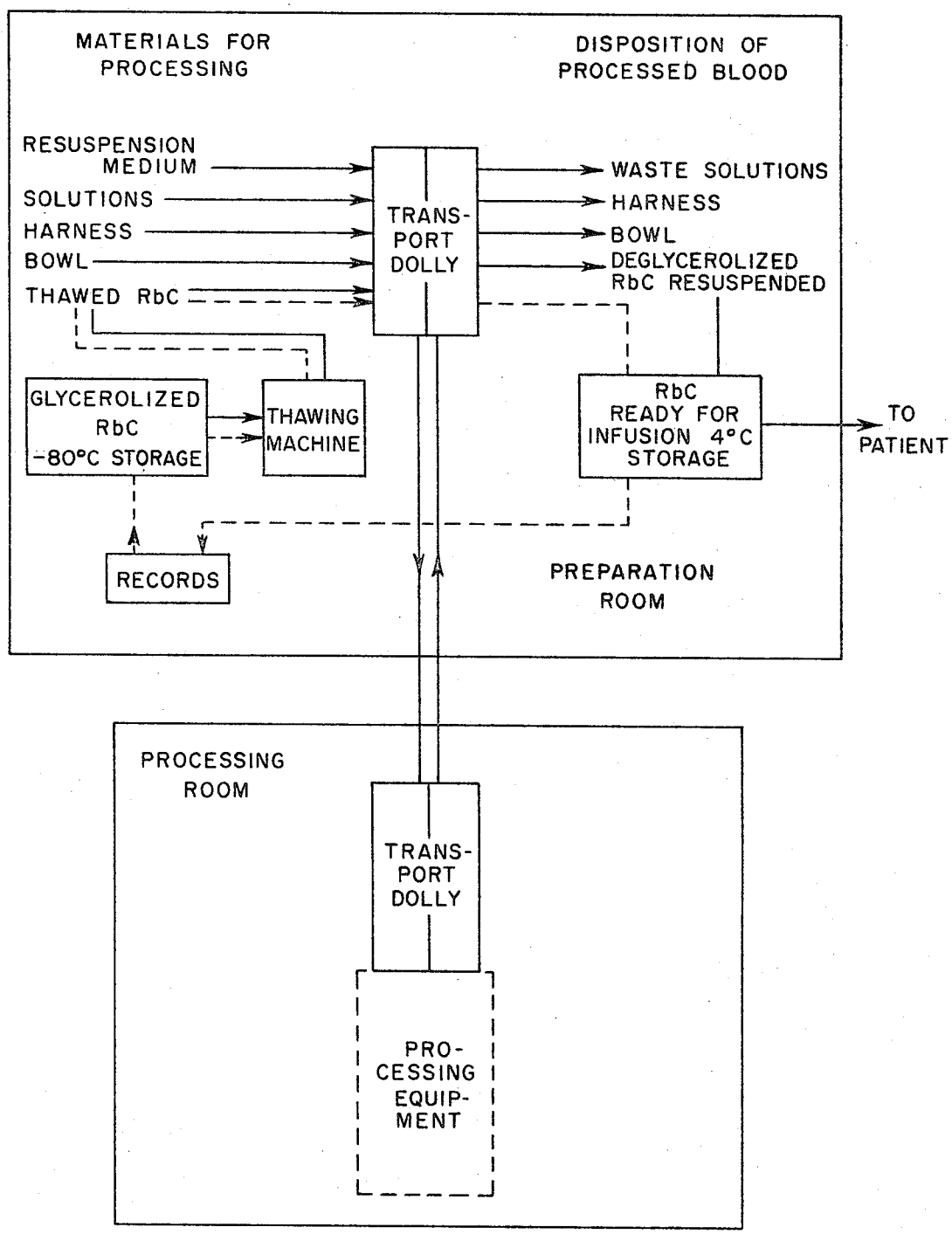
FIG. 10 is a diagram illustrating one mode of the use of the transport dolly.

The use of the transport dolly of this invention in deglycerolizing blood is illustrated in diagrammatic fashion in FIG. 10. In the preparation room the dolly is loaded with the solution containers positioned on the dolly in the proper order, with a resuspension medium, a pump harness, a centrifuge bowl and a plastic pouch of thawed red blood cells to be deglycerolized. While these processing materials are being loaded on one side of the dolly, the various materials resulting from a previous processing cycle are removed from the other side of the dolly. As indicated in FIG. 10, these are the waste solutions, the harness, bowl and processed blood in the form of resuspended deglycerolized red cells. With the loading and unloading of the dolly in the preparation room comes the processing of records in any suitably failsafe manner. FIG. 10 illustrates one way in which records may be handled.

The transport dolly is intended to carry only one set of blood cells, solutions, harness and bowl on its trips between the preparation and processing rooms. When it arrives in the preparation room with a processed set on its left side the right side is empty ready to receive the next set to be processed. In the preparation room the right side is loaded with the next set and the processed set is unloaded. Upon arrival at the processor the dolly is loaded on its left side by unloading the processed set from the processor and is then unloaded on its right side to load the processor for the next run. There are, of course, many other operational modes for the dolly, the one illustrated in FIG. 10 being only exemplary of one of these.

From the above description it will be seen that there is provided a unique transport dolly particularly suitable for handling liquids and for transporting them from one area to another while at the same time maintaining them in a sterile condition and in a predetermined sequence. The transport dolly is particularly suitable for handling blood in various forms along with liquids used to treat the blood during the collecting, processing and transfusion processes.

It will thus be seen that the objects set forth above, among those made apparent from the preceding description, are efficiently attained and since certain changes may be made in the above constructions without departing from the scope of the invention, it is intended that all matter contained in the above description or shown in the accompanying drawings shall be interpreted as illustrative and not in a limiting sense.

I claim:

1. A transport dolly suitable for moving containers of liquids positioned in predetermined order, comprising in combination:
   a. movable base means;
   b. a vertically disposed support post affixed to said base means and movable therewith;
   c. upper tray assembly means affixed to the upper end of said support post;
   d. two parallel guide bars depending from and attached to said tray assembly means, said parallel guide bars being on opposite sides of said post;
   e. carrier assembly means adapted to hold a plurality of liquid containers in a position to deliver liquid therefrom, said carrier assembly having a pair of parallel grooved tracks affixed along the top thereof and adapted for engagement of and sliding movement along one of said guide bars; and
   f. central tray assembly means affixed to said support post between said base means and said upper tray assembly means.

2. A transport dolly in accordance with claim 1 wherein said guide bars have latch means at one end, said latch means being adapted positively to lock said guide bars to the guide bars of equipment arranged to receive said carrier assembly means from said transport dolly.

3. A transport dolly in accordance with claim 1 wherein said tray assembly means has a plurality of supporting pins affixed to one side thereof.

4. A transport dolly in accordance with claim 1 including bag support assembly means adapted to support at least one bag therefrom, said bag support assembly means being affixed to said support post.

5. A transport dolly in accordance with claim 1 wherein said carrier assembly means comprises in combination:
   a. an open-faced rectangular housing;
   b. a plurality of openings in the bottom of said housing adapted to permit passage of a bottle neck therethrough whereby said bottles are held neck down; and
   c. a pivotally mounted bottle guard bar extending across the open face of said housing.

6. A transport dolly in accordance with claim 5 wherein said openings have rubber collars on which the shoulders of said bottles rest.

7. A transport dolly in accordance with claim 5 wherein the inner wall of said housing has a cushioning member adapted to protect said bottles, and bottle spacing members adapted to maintain the bottles in spaced relationship.

8. A transport dolly in accordance with claim 5 having label mounting means affixed to the internal wall of said housing above each of said openings, one of said label mounting means being associated with each bottle position.

9. A transport dolly in accordance with claim 1 wherein said carrier assembly means comprises an open-framework structure, that portion of said framework coming in contact with said liquid containers being coated with a resilient cushioning means such as an elastomer.

10. A transport dolly in accordance with claim 9 wherein said open-framework structure forming said carrier assembly means has a bottom which is contoured to permit the shoulders of bottles to rest and be supported thereon.

11. A transport dolly in accordance with claim 9 wherein said open-framework structure forming said carrier assembly means has a plurality of hooks adapted to have plastic pouches suspended therefrom.